May 29, 1934.  E. PATTERSON  1,960,594
HARVESTER
Filed June 12, 1928
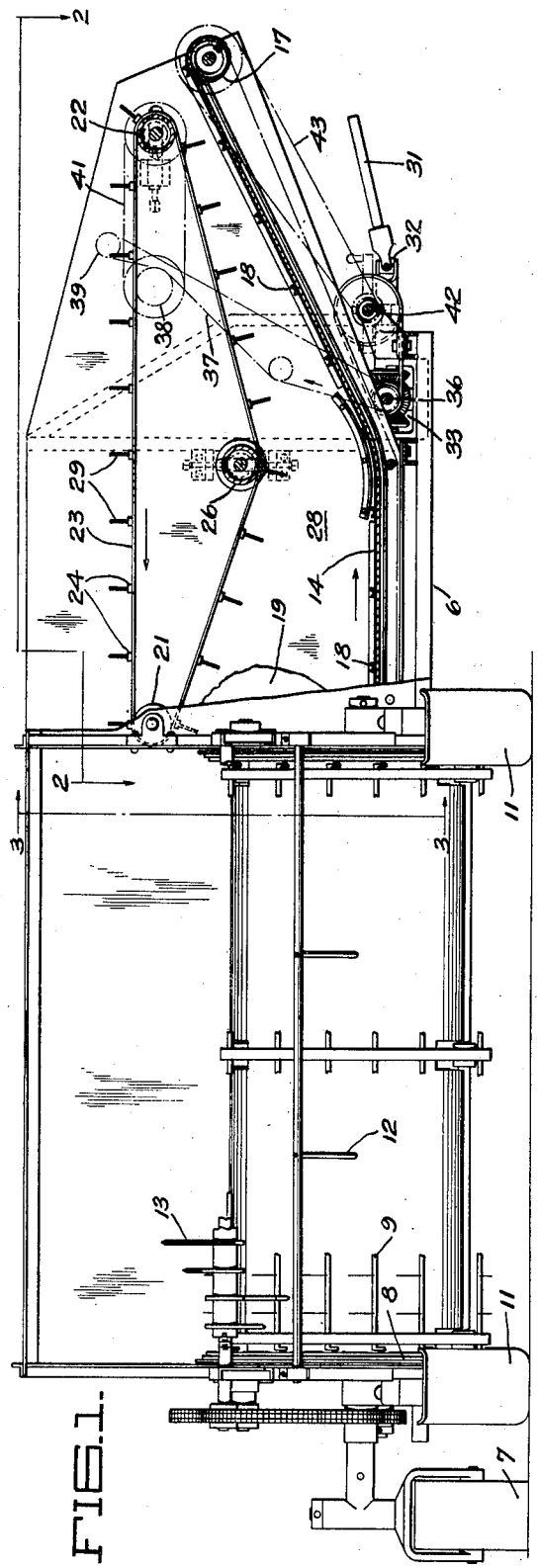
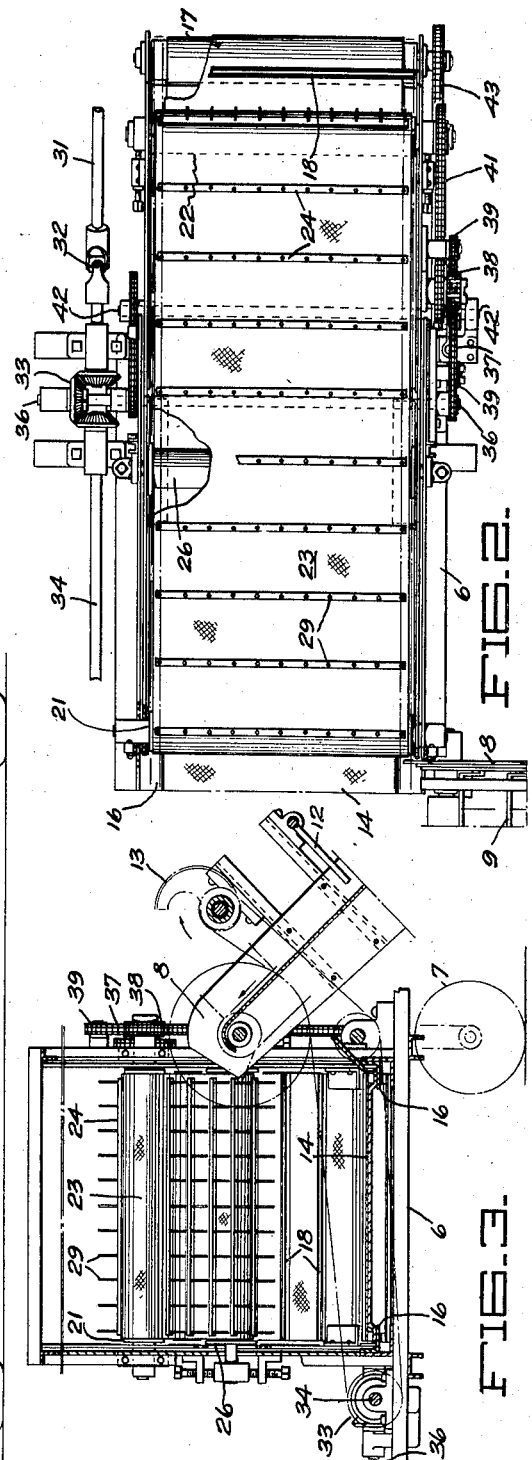
INVENTOR:
Elmer Patterson
BY
White, Prost & Fryer
ATTORNEYS.

Patented May 29, 1934

1,960,594

UNITED STATES PATENT OFFICE 1,960,594

HARVESTER

Elmer Patterson, Stockton, Calif., assignor, by mesne assignments, to Caterpillar Tractor Co., San Leandro, Calif., a corporation of California Application June 12, 1928, Serial No. 284,719

21 Claims. (Cl. 56—364)

My invention relates to harvesting machinery and particularly to that type of harvesting machines usually termed "pick-up feeders".

In harvesting standing grain it is often expedient to cut the grain as one separate and distinct operation and to leave the cut grain lying on the ground in windrows or to tie the cut grain together in bundles which are stacked in shocks and left in the field. As a subsequent and also distinct step in the harvesting operation, another mechanism is driven over the field to pick up the windrows of grain or to gather in the shocks or bundles and convey them to a separating or threshing mechanism which separates the grain kernels from the grain straw. Particularly in the case of pick-up feeders which engage bundles or shocks of grain standing in the field and convey them to a separating mechanism, difficulty has been experienced in the past in feeding the gathered grain to the separating mechanism in a suitable manner. It is characteristic of such separating mechanisms that their efficiency is increased by feeding grain to them in substantially a uniform, continuous manner. However, when a shock, consisting of a number of bundles of grain, is encountered by a pick-up, the entire quantity of grain in the shock is discharged into the separator thereby overloading it to a considerable extent. This is followed by a lull period during which substantially no grain is conducted to the separator. Such a periodic and intermittent method of feeding the grain is not productive of good results.

It is therefore an object of my invention to provide in a pick-up feeder means for insuring that the feeding of grain will be uniform.

Another object of my invention is to simplify the mechanism to such an extent as to make it commercially practicable.

Another object of my invention is to provide a means particularly adaptable for use with bundles of grain to feed such bundles to a separating mechanism so that the maximum efficiency thereof may be obtained.

The foregoing and other objects are attained in the embodiment of the invention shown in the drawing, in which Fig. 1 is a front elevation of a pick-up feeder, a portion being broken away to disclose the mechanism particularly associated with my invention.

Fig. 2 is a plan of the mechanism particularly shown in the right half of Fig. 1, a portion being shown in section on the line 2—2 of Fig. 1.

Fig. 3 is a cross-section on the line 3—3 of Fig. 1.

In its preferred form, the harvester of my invention includes a first conveyor on which bundles of grain are adapted to be deposited and which is associated with a second conveyor in such a manner as to leave a passage for grain therebetween, the second conveyor being provided with means adapted to engage the grain to exert a combing action thereon.

As disclosed in the drawing, the harvester of my invention usually comprises a framework 6 composed of angle irons or other suitable shapes of metal, which is adapted at one end to be attached to the frame of the separator portion of a combined harvester, not shown. The other end of the framework 6 is conveniently supported on a caster wheel 7 engaging the ground. At the leading edge of the framework is secured a pick-up framework, suitably fabricated, which carries a pick-up mechanism 9. The lower end of the pick-up framework is supported on ground engaging shoes 11 which guide the pick-up mechanism as the framework is driven over the field toward a shock of grain. The plurality of bundles making up the shock are engaged by the pick-up mechanism and are carried upwardly past the bundle-turner 12 and the band-cutter 13. As the bundles pass over the pick-up framework they are properly arranged and have their bands severed so that the grain is freed from restraint and can be discharged over the trailing end of the pick-up onto a conveyor or draper 14 of the usual kind. This draper preferably comprises a continuous belt of canvas or other similar material which operates between guides 16 on the framework 6 and at the end proximate the separator, extends upwardly over an incline and around a roller 17 which is suitably driven. At intervals on the material of the draper 14 are disposed a plurality of draper sticks 18 which assist in conveying the grain from the pick-up feeder toward the separator unit.

It will be appreciated that as shocks of grain are encountered by the pick-up mechanism, they are engaged bodily and carried past the bundle-turner and the band-cutter and then are discharged on the draper 14. Inasmuch as the shocks are disposed at intervals throughout the grain field, the draper is in receipt of a considerable quantity of cut bundles of grain at a given instant after which it receives no grain for a period prior to engagement with the next succeeding shock. It thus occurs that at one moment the draper may contain a pile of straw 19 which is being slowly propelled toward the separating mechanism but which, in the form it assumes on the draper, is far in excess of the efficient capacity of the separating mechanism. Therefore, in accordance with my invention, I have provided means for arranging the straw on the draper in such a manner that the separator will receive the straw and operate upon it at maximum efficiency.

Situate in the framework 6 of the pick-up feeder are a pair of rollers 21 and 22 arranged to receive a second conveyor or draper 23. This draper is preferably of fabric such as canvas and is provided at intervals with draper sticks 24 in the standard manner. In addition to the two rollers 21 and 22, I preferably provide a third roller 26 which is effective to impart a triangular contour to the draper 23. This roller is also supported in the framework 6 and is preferably made adjustable therein. The disposition of roller 26 is such that the passage 28 intermediate the upper draper and the lower draper can be given the desired incline or convergence in order to deal properly with the pile of grain being advanced by the draper 14. Inasmuch as the angle of inclination is adjustable, the machine can be arranged to operate most expeditiously with various different kinds and characters of grain. Depending somewhat on the adjustment of roller 26 and also on the adjustment of roller 22 which is arranged to take up the slack in the draper and also to compensate for adjustments in roller 26, the passage 28 can be arranged to have substantially parallel sides to converge or diverge, depending largely upon the material being handled.

Although the mechanism so far described is effective to a certain degree in handling the grain as desired, I have found that its operation is distinctly improved by providing a plurality of projections 29 which can be in the form of spikes or fingers projecting thru the draper sticks 24 and extending into the grain passage 28. Further, I preferably operate the draper 23 at a rate considerably in excess of the rate of advance of draper 14 so that the grain being advanced by the lower draper comes into contact with the projections 29 on the upper draper and is combed off and arranged in such a manner as to present a substantially uniform bed of grain to the separating mechanism.

The drive for the two drapers is expeditiously derived from the source of power ordinarily present on the separating portion of the mechanism although other sources of motive power can be employed. Usually, the pick-up feeder is connected to the separator by a drive shaft 31 which connects thru a universal joint 32 with a gear nest 33. From the gear nest a shaft 34 extends to the outer end of the mechanism and drives the band-cutter while a transverse shaft 36 passes below the draper 14 and at its remote end engages a chain 37 held in engagement with a pair of sprockets 38 by idlers 39. The motion of the sprockets 38 is transferred to the drum 32 by a suitable chain 41 and preferably drives the drum and its draper 23 at a speed considerably in excess of the speed of the draper 14, although by providing gears of suitable diameter, the relative rates of advance of the two drapers can be varied at will. Also driven from shaft 36 is a parallel shaft 42 which extends below the draper 14 and by means of a chain 43 drives the drum 17 to propel the draper 14.

It has been found in practice that a harvester constructed according to my invention affords a uniform feed of grain to the separating mechanism, is economically and commercially practicable, and represents a distinct advance over the prior art.

It is to be understood that I do not limit myself to the form of harvester shown and described herein, as the invention, as set forth in the following claims may be embodied in a plurality of forms.

I claim:

1. In a harvester, means for depositing material onto a draper for conveying said material along a straight line path, said draper extending substantially parallel to said means and beyond an end of said means, and a second draper substantially parallel to and adjacent said end of said means and spaced from the first draper to maintain a uniform discharge of material from said first draper to a threshing machine.

2. In a harvester, means for depositing material onto a draper for conveying said material along a straight line path, said draper extending substantially parallel to said means and beyond an end of said means, and a second draper substantially parallel to and adjacent said end of said means and spaced from the first draper to maintain a uniform discharge of material from said first draper to a threshing machine, the space between said drapers being widest adjacent said end of said means.

3. In a harvester, means for depositing material onto a draper for conveying said material, said draper extending substantially parallel to said means and beyond an end of said means, a second draper substantially parallel to and adjacent said end of said means and spaced from the first draper to maintain a uniform discharge of material from said first draper to a threshing machine, the space between said drapers being widest adjacent said end of said means, and means operating said second draper at a greater speed than said first draper.

4. In a harvester, a draper comprising an endless conveyor to receive material from the field, a second draper comprising an endless conveyor spaced from the first draper to maintain a uniform discharge of material from said first draper to a threshing machine, and projecting teeth on one of said drapers to comb the material on the other draper.

5. In a harvester, a draper comprising an endless conveyor to receive material from the field, a second draper comprising an endless conveyor spaced from the first draper and forming a passageway between said drapers, projecting teeth on one of the drapers to comb the material on the other draper, and means operating said drapers at different speeds.

6. In a harvester, a draper comprising an endless conveyor to receive material from the field, a second draper comprising an endless conveyor spaced from the first draper to form a passageway between said drapers, said passageway being wider at the entrance end for material than at the discharge end for the material, projecting teeth on the second draper to comb the material on the first draper, and means operating said drapers at different speeds.

7. In a harvester, a draper to receive material from the field and adapted to discharge material to a thresher, and means cooperating with said draper to maintain uniform discharge of material to said thresher regardless of the rate of supply of material to said draper, said means comprising an endless conveyor adjacent to and spaced from said draper to provide a passageway for material, the reach of said conveyor opposed to said draper running over an adjustable member positioned intermediate the turns of said conveyor, and means for adjusting said member to vary the spacing between the draper and said conveyor.

8. In a harvester, a draper to receive material from the field and adapted to discharge material to a thresher, and means cooperating with said draper to maintain uniform discharge of material to said thresher regardless of the rate of supply of material to said draper, said means comprising an endless conveyor adjacent to and spaced from said draper to provide a passageway for material, said passageway being wider at the entrance end for said material than at the discharge end, the reach of said conveyor opposed to said draper running over an adjustable member positioned intermediate the turns of said conveyor, and means for adjusting said member to vary the spacing between the draper and said conveyor.

9. In a harvester, a draper to receive material from the field and adapted to discharge material to a thresher, and means cooperating with said draper to maintain uniform discharge of material to said thresher regardless of the rate of supply of material to said draper, said means comprising an endless conveyor adjacent to and spaced from said draper to provide a passageway for material, said passageway being wider at the entrance end for said material than at the discharge end, the reach of said conveyor opposed to said draper running over an adjustable member positioned intermediate the turns of said conveyor, means for adjusting said member to vary the spacing between the draper and said conveyor, and teeth projecting from said conveyor to comb material on said draper.

10. In a harvester, a draper to receive material from the field and adapted to discharge material to a thresher, and means cooperating with said draper to maintain uniform discharge of material to said thresher regardless of the rate of supply of material to said draper, said means comprising an endless conveyor adjacent to and spaced from said draper to provide a passageway for material, the reach of said conveyor opposed to said draper running over an adjustable member positioned intermediate the turns of said conveyor, means for adjusting said member to vary the spacing between the draper and said conveyor, teeth projecting from said conveyor to comb material on said draper, and means for operating said conveyor at a greater speed than said draper.

11. In a harvester, a draper for conveying material to a thresher, a conveyor spaced from and converging toward said draper to maintain uniform discharge of material, means for adjusting said conveyor to vary the spacing between it and the draper, and means on said conveyor for combing material on said draper.

12. In a harvester, a draper for conveying material to a thresher, a conveyor spaced from and converging toward said draper to maintain uniform discharge of material, means for adjusting said conveyor to vary the spacing between it and the draper, teeth on said conveyor for combing material on said draper, and means for operating said draper and said conveyor at different speeds.

13. In a harvester, a draper having a substantially horizontal portion and an upwardly inclined portion, and a conveyor for maintaining uniform discharge of material from the draper and positioned in spaced relationship over the draper, the under reach of said conveyor having a portion converging upwardly toward the inclined portion of the draper and another portion converging downwardly toward the substantially horizontal portion of the draper.

14. In a harvester, a draper having a substantially horizontal portion and an upwardly inclined portion, a conveyor for maintaining uniform discharge of material from the draper and positioned in spaced relationship over the draper, the under reach of said conveyor having a portion converging upwardly toward the inclined portion of the draper and another portion converging downwardly toward the substantially horizontal portion of the draper, and an adjustably positionable roller intermediate the turns of and contacting the under reach of said conveyor for varying the spacing between the draper and the conveyor.

15. In a harvester, a draper having a substantially horizontal portion and an upwardly inclined portion, a conveyor for maintaining uniform discharge of material from the draper and positioned in spaced relationship over the draper, the under reach of said conveyor having a portion converging upwardly toward the inclined portion of the draper and another portion converging downwardly toward the substantially horizontal portion of the draper, teeth on the conveyor for combing material on the draper, and means for operating the conveyor at a greater speed than the draper.

16. In a harvester, a draper having a substantially horizontal portion and an upwardly inclined portion, a conveyor for maintaining uniform discharge of material from the draper and positioned in spaced relationship over the draper, the under reach of said conveyor having a portion converging upwardly toward the inclined portion of the draper and another portion converging downwardly toward the substantially horizontal portion of the draper, an adjustably positionable roller intermediate the turns of and contacting the under reach of said conveyor for varying the spacing between the draper and the conveyor, teeth on the conveyor for combing material on the draper, and means for operating the conveyor at a greater speed than the draper.

17. In a harvester, a draper for conveying material and having an upper conveying reach, a conveyor spaced over the draper and having an under reach movable in the same direction as the direction of movement of said upper conveying reach of said draper, and means for operating the conveyor at a greater speed than said draper to maintain uniform discharge of material from the draper.

18. In a harvester, a draper for conveying material and having an upper conveying reach, a conveyor spaced over the draper and having an under reach movable in the same direction as the direction of movement of said upper conveying reach of said draper, teeth on said conveyor for combing material on the draper, and means for operating the conveyor at a greater speed than said draper to maintain uniform discharge of material from said draper.

19. In a harvester machine, a main draper extending transversely with respect to the line of draft of the machine for conveying material gathered from a field toward an end of said draper, said draper having an upper conveying reach and an under return reach, a conveyor positioned over said draper adjacent said end of said draper, said conveyor also extending transversely with respect to the line of draft of the machine and having an upper reach and an under reach spaced from the upper reach of said draper, and means for mounting said draper and conveyor for adjustment relative to each other to vary said space.

20. In a harvester machine, a main draper extending transversely with respect to the line of draft of the machine and having an under return reach and an upper conveying reach for conveying material gathered from a field toward an end of said draper, a portion of the upper reach of said draper adjacent said end being inclined upwardly, an endless conveyor positioned over said inclined portion and extending transversely with respect to the line of draft of said machine, said conveyor having an upper reach and a lower reach spaced with respect to said inclined portion, the space being narrowest adjacent the upper end of said inclined portion to provide a passageway for the material which passageway is widest at the entrance end for the material, and means for moving said upper reach of the draper and said under reach of the conveyor in the same direction.

21. In a harvester machine, a main draper extending transversely with respect to the line of draft of the machine and having an under return reach and an upper conveying reach for conveying material gathered from a field toward an end of said draper, a portion of the upper reach of said draper adjacent said end being inclined upwardly, an endless conveyor positioned over said inclined portion and extending transversely with respect to the line of draft of said machine, said conveyor having an upper reach and a lower reach spaced with respect to said inclined portion, the space being narrowest adjacent the upper end of said inclined portion to provide a passageway for the material which passageway is widest at the entrance end for the material, means for moving said upper reach of the draper and said under reach of the conveyor in the same direction, and mounting means for said conveyor adjustable to vary the width of the entrance end of said passageway.

ELMER PATTERSON.